United States Patent
Kretschmer

[11] 3,794,385
[45] Feb. 26, 1974

[54] FASTENING ARRANGEMENT FOR DECORATIVE WHEEL RINGS

[76] Inventor: Paul Kretschmer, Hohenstr. 18, Waldaschaff, Germany

[22] Filed: July 10, 1972

[21] Appl. No.: 270,222

[52] U.S. Cl.............................................. 301/37 P
[51] Int. Cl.............................................. B60b 7/06
[58] Field of Search... 301/37 R, 37 P, 108 R, 37 C; 24/73 R, 73 B, 73 SC, 73 HC

[56] References Cited
UNITED STATES PATENTS

| | | | |
|---|---|---|---|
| 2,174,087 | 9/1939 | Horn | 301/37 CD |
| 3,043,632 | 7/1962 | Wagner | 301/37 R |
| 2,761,188 | 9/1956 | Bedford | 301/37 CD X |
| 3,060,535 | 10/1962 | Munse | 24/73 B |

FOREIGN PATENTS OR APPLICATIONS

| | | | |
|---|---|---|---|
| 1,209,798 | 10/1970 | Great Britain | 301/37 P |
| 7,024,310 | 10/1970 | Germany | 301/37 P |

Primary Examiner—Richard J. Johnson
Attorney, Agent, or Firm—Harness, Dickey & Pierce

[57] ABSTRACT

A plurality of axial clip-receiving recesses each having an axial ramp are provided on an axial flange of a decorative wheel ring. A clip for fastening the ring to a vehicle wheel is inserted in each recess and axially interlocked behind the end of each ramp.

3 Claims, 2 Drawing Figures

PATENTED FEB 26 1974  3,794,385

FASTENING ARRANGEMENT FOR DECORATIVE WHEEL RINGS

This invention relates to a fastening arrangement for securing a decorative wheel ring on a vehicle wheel.

Heretofore, in one type of fastening arrangement, fastening clips have been inserted within axial recesses on an axial flange of the decorative ring.

An object of the present invention is to improve this type of fastening arrangement by improving the assembly of clips into the recesses on the ring while at the same time facilitating installation on a vehicle wheel. Another object is to provide an improved clip, an improved assembly and an improved retention of the clip on the decorative wheel ring. A further object is to provide a fastening arrangement wherein the decorative ring can be readily applied to the vehicle wheel and when once applied, is securely retained on the wheel.

According to the disclosure, paired side walls are provided at intervals along an annular axial flange of the decorative wheel ring, with each pair of side walls joined by a top wall spaced radially of the annular flange and an end wall at the axially outer end of each pair of side walls. A fastening clip is held in place in each recess defined by the aforementioned walls. An axial ramp is provided in each recess. The clip rides along this ramp during insertion into the recess and when fully inserted locks behind the end of the ramp. Preferably, a bead is provided on the clip to lodge in an opening between the end wall and one of the other walls and assist in interlocking the clip in the recess. The axially inner end of each recess is open and the clip protrudes through, terminating in a spring leg directed generally radially outwardly for biting engagement with an axial wheel flange when the ring is applied to the wheel. The spring leg is connected by means of a curved bend to the central region of the clip to facilitate flexing.

The accompanying drawings illustrate a preferred embodiment of the invention.

Figure 1:
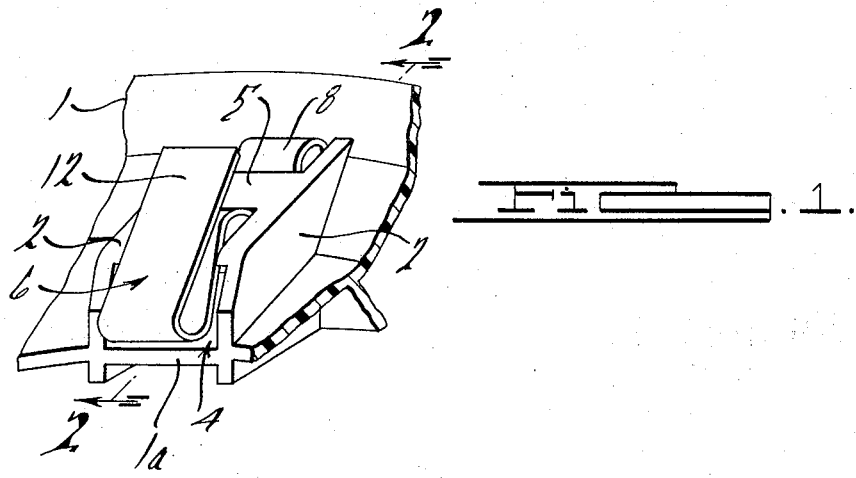
FIG. 1 is a fragmentary perspective view of a decorative ring embodying the fastening arrangement of the invention.
Figure 2:
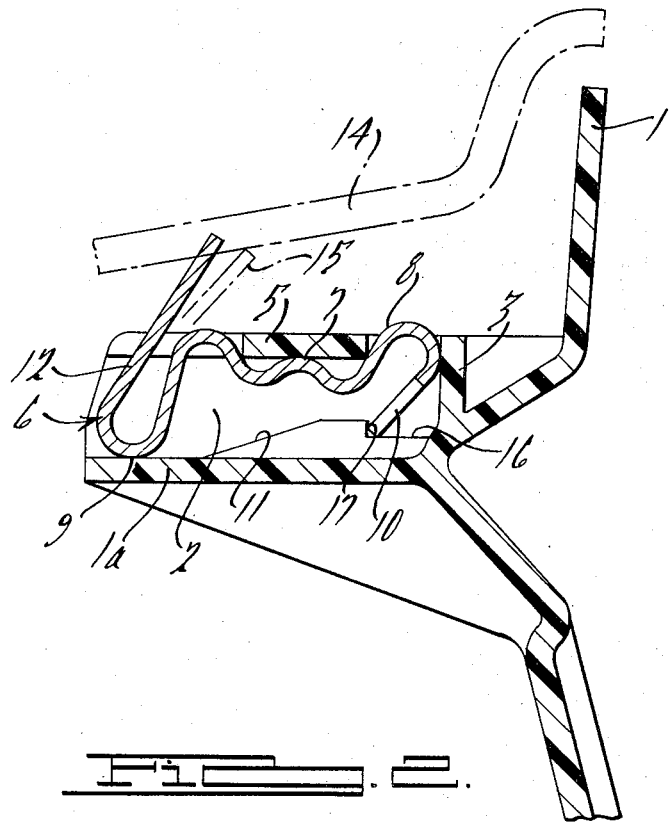
FIG. 2 is a vertical sectional view taken along line 2—2 in FIG. 1.

In the drawings, a plastic decorative ring 1 is provided with an axial flange 1a. (It will be appreciated that ring 1 may either partially or fully cover the vehicle wheel to which it is applied and may be either circular or annular in shape.) A plurality of clip receiving recesses 4 are provided on the radially outer surface of flange 1a at intervals around ring 1. Each recess 4 is defined by a pair of circumferentially spaced side walls 2 which project radially and axially of flange 1a. The axially outer end of each recess 4 is defined by an end wall 3. A top wall 5 bridges side walls 2 in axially inwardly spaced relation to end wall 3 and in radially outwardly spaced relation to flange 1a. An inclined ramp 11 inclining inwardly of recess 4 in the axially outwardly direction is provided on flange 1a. Ramp 11 stops short of end wall 3. A ledge 16 on flange 1a extends between the axially outer end of ramp 11 and end wall 3 thereby defining a shoulder 17 projecting outwardly from the axially outer end of ramp 11.

A fastening clip 6 is inserted within each recess 4. Clip 6 comprises a central portion 7 and preferably a curved bead 8 at the axially outer end of portion 7. Bead 8 is fashioned to protrude through and fit in the space between top wall 5 and end wall 3 to assist in axially interlocking clip 6 within recess 4. Bead 8 is looped to re-enter recess 4 with circumferentially spaced end legs 10 projecting from the re-entrant portion of bead 8 to lodge behind shoulder 17. When clip 6 is being inserted into recess 4 via the open axially inner end of the recess, legs 10 ride along ramp 11 increasingly flexing the resilient beaded outer end of the clip. Once legs 10 are inserted beyond ramp 11, the flexation is relieved to a certain extent with legs 10 lodging on ledge 16 behind shoulder 17. With clip 6 interlocked with recess 4, bead 8 is flexed to resiliently urge not only clip portion 7 against top wall 5, and in turn force bead 8 into the space between top wall 5 and end wall 3, but also urge the free ends of legs 10 onto ledge 16 and behind shoulder 17. Thus, each clip 6 is forcibly retained and axially interlocked on ring 1.

The axially inner end of clip 6 comprises a curved bend 9 at the inner end of portion 7 which curves onto flange 1a and thence, outwardly into a spring leg 12. Spring leg 12, is directed generally radially outwardly when in its free state. As ring 1 is increasingly applied to a vehicle wheel 14, spring leg 12 is increasingly deflected by the axial wheel flange; when ring 1 is fully applied, spring leg 12 assumes the position indicated at 15 to bitingly engage the axial wheel flange thereby securely retaining ring 1 on wheel 14. The arrangement of bend 9 and spring leg 12 permits ring 1 to be applied to wheel 14 with minimum effort yet, at the same time provides a sufficient retention force to hold ring 1 securely on wheel 14.

It will be observed that since clip 6 is axially interlocked within recess 4, it will not move axially outwardly relative to flange 1a when ring 1 is applied to wheel 14. Thus, spring leg 12 will be accurately positioned relative to wheel 14 when ring 1 is fully applied to the wheel and proper engagement with the axial wheel flange is always assured. Likewise, when ring 1 is removed, clip 6 can not be pulled out of its recess and hence, is always removed along with ring 1.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. Fastening means for fastening a decorative wheel ring on the axially outer face of a vehicle wheel having an annular axial wheel flange, said fastening means comprising axial flange means on said ring adapted to lie radially inwardly of the axial wheel flange when the ring is applied to the wheel, means defining a plurality of clip-receiving recesses on said flange means around said ring, each recess comprising an end wall means at the axially outer end thereof, a pair of circumferentially spaced side wall means extending axially inwardly of said end wall means and a top wall means bridging said pair of side wall means in radially spaced relation to said axial flange means and in axially spaced relation to said end wall means to provide a free space between said end wall means and said top wall means, a ramp within each recess inclining inwardly of the recess in the axially outward direction, an outwardly extending shoulder at the axially outer end of said ramp, and a spring clip disposed within each recess and adapted to engage the annular axial wheel flange, each clip comprising an interlocking portion lodged behind said shoulder and extending from behind said shoulder to bear against said end wall means and form a bead lodging within said free space, each said clip also including a section extending from said bead and axially embracing said top wall means.

2. Fastening means for fastening a decorative wheel ring on the axially outer face of the vehicle wheel having annular axial wheel flange, said fastening means comprising: axial flange means on said ring adapted to lie radially inwardly of the axial wheel flange when the ring is applied to the wheel; means defining a plurality of clip-receiving recesses on said flange means around said ring; each of said clip-receiving recesses comprising an end wall means at the axial outer end thereof and a top wall means spaced radially from said axial flange means, said top wall means having axially inner and outer edges; means forming an opening in said top wall means immediately adjacent said end wall means; and a spring clip within each recess and adapted to engage the annular axial wheel flange; each clip comprising a resilient retaining finger supported on said axial flange means and extending axially and radially outwardly therefrom, an intermedtiate section extending from said retaining finger including a section embracing the top wall means and contacting the axially inner and outer edges thereof, and an interlocking section extending from said intermediate section and having a bead lodging within said opening and bearing against said end wall means.

3. Fastening means as claimed in claim 2 wherein said intermediate section also contacts the inner surface of said top wall means between the axially inner and outer edges thereof.

* * * * *